(12) United States Patent
Urig

(10) Patent No.: US 11,680,785 B2
(45) Date of Patent: Jun. 20, 2023

(54) METHOD AND APPARTUS FOR ADJUSTABLE GAUGE BLOCK

(71) Applicant: Woodpeckers, LLC, Strongsville, OH (US)

(72) Inventor: Kody M. Urig, Avon, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 0 days.

(21) Appl. No.: 17/533,641

(22) Filed: Nov. 23, 2021

(65) Prior Publication Data
US 2023/0160677 A1   May 25, 2023

(51) Int. Cl.
*G01B 3/30* (2006.01)
*G01B 5/14* (2006.01)

(52) U.S. Cl.
CPC .............. *G01B 3/306* (2013.01); *G01B 5/14* (2013.01)

(58) Field of Classification Search
USPC ....................................................... 33/567.1
See application file for complete search history.

(56) References Cited

U.S. PATENT DOCUMENTS

| | | | | |
|---|---|---|---|---|
| 1,040,774 A * | 10/1912 | Schamel | ................ | G01B 3/306 269/80 |
| 1,228,791 A * | 6/1917 | Laubscher | ............. | G01B 3/306 33/567.1 |
| 1,489,747 A * | 4/1924 | Edrany | .................. | G01B 3/306 33/567.1 |
| 1,562,554 A * | 11/1925 | Hardgrove | ............... | G01B 3/28 33/567.1 |
| 2,330,412 A * | 9/1943 | Dierking | ................ | G01B 3/306 33/567.1 |
| 2,372,368 A * | 3/1945 | Dierking | ................ | G01B 3/306 33/567.1 |
| 2,471,684 A * | 5/1949 | Hastings | ................ | G01B 3/306 33/567.1 |
| 2,518,080 A * | 8/1950 | Schury | .................... | G01B 3/306 33/567.1 |
| 2,547,114 A * | 4/1951 | Ellis | ........................ | G01B 3/306 33/567.1 |
| 2,821,022 A * | 1/1958 | Woodward | ........... | G01B 5/0004 33/795 |
| 2,867,909 A * | 1/1959 | Keller | ..................... | G01B 3/306 82/148 |
| 2,876,552 A * | 3/1959 | Zelnick | .................. | G01B 3/306 33/567.1 |

(Continued)

FOREIGN PATENT DOCUMENTS

DE     29824838 U1 *  4/2003   ............. A01F 12/28

*Primary Examiner* — Christopher W Fulton
(74) *Attorney, Agent, or Firm* — Sand, Sebolt & Wernow Co., LPA

(57) ABSTRACT

An adjustable gauge block that may be quickly adjusted to a desired height and then dialed in to a precision measurement that can replace a set of gauge blocks. The adjustable gauge block of the present disclosure may be further used as a repeatable and precise physical reference to set tool depths and heights. The adjustable gauge block of the present disclosure may be utilized as a physical reference to set drill press bit depths, table saw blade heights, router table bit heights, and the like. Additionally, the adjustable gauge block of the present disclosure may be utilized to check uniformity of thickness along an edge of a piece of stock.

20 Claims, 12 Drawing Sheets

(56) References Cited

U.S. PATENT DOCUMENTS

| | | | | | |
|---|---|---|---|---|---|
| 3,247,598 | A | * | 4/1966 | Wilkes | F16H 25/183 33/567.1 |
| 3,406,457 | A | * | 10/1968 | Poulin | G01B 3/306 33/802 |
| 3,529,699 | A | * | 9/1970 | Smith | G01B 3/306 188/40 |
| 3,638,323 | A | * | 2/1972 | Groe | G01B 3/306 33/567.1 |
| 3,664,031 | A | * | 5/1972 | Duffy | G01B 3/306 33/640 |
| 4,168,574 | A | * | 9/1979 | Chase | G01B 3/306 33/567.1 |
| 5,168,637 | A | * | 12/1992 | Gibson | B23D 59/001 33/832 |
| 5,382,120 | A | * | 1/1995 | Parsons | G01B 5/18 408/202 |
| 5,491,906 | A | * | 2/1996 | Reilly | B23D 59/00 33/640 |

\* cited by examiner

METHOD AND APPARTUS FOR ADJUSTABLE GAUGE BLOCK

TECHNICAL FIELD

The present disclosure relates generally to the field of woodworking and woodworking gauges. More particularly, in one example, the present disclosure relates to an adjustable gauge block. Specifically, in another example, the present disclosure relates to an adjustable gauge block for use as a physical reference for setting or checking tool depths and heights to allow precision adjustment and repeatable measurement thereof.

BACKGROUND

Woodworking is a skill of making items from wood, including cabinetry, woodcarving, joinery, carpentry, woodturning, and the like. Accordingly, woodworking, whether as a profession or a hobby, tends to utilize a number of various tools including saws, drills, planers, and routers, to name a few. Most woodworkers utilize multiple power tools and/or hand tools for each individual product. Further, when constructing items of relatively large size or with high complexity, it is very common to utilize multiple tools in multiple configurations. According to one example, cabinetry commonly involves the use multiple types of saws using different size or types of saw blades to make different types of cuts. Further, the depth of each cut may vary depending upon the particular portion of the piece being built and the desired cutting effect. One such cut may be desirable when cutting stock to size for the framework of a cabinet or the like, wherein the depth of such cuts allows the blade to cut through the entire thickness of the stock. Where creating dado cuts for shelving placement within a cabinet unit, for example, the desired depth may be only a portion of the thickness of the piece of stock.

Similarly, when utilizing a drill press or router table or the like, the respective bits for each are desirable to be set to precision heights and/or depths to provide a uniform and consistent cut, or similarly, a uniform or consistent drill hole.

Currently, these heights and depths of various woodworking tools may be set utilizing a multitude of measurement devices including, but not limited to, rulers, tape measures, micrometers, and/or gauge blocks. However, many of these tools are not universally applied in that they may be suitable for setting one height or one depth of a particular tool but then not suitable for use with other tools or other height/depth settings. Further, some of these measurement tools are imprecise in that measuring one tool, for example, a table saw blade height, and then measuring a second tool, for example, a drill press depth utilizing the same measurement tool may provide slightly different measurements. This is particularly the case when utilizing measurement devices that may be adjusted or changed between measurements, such as tape measures, micrometers, and the like. Other tools, such as planar gauges may provide repeatable placements, but they tend to be less precise as a separate measurement tools must be used to set the position of the gauge.

Alternatively, precision gauge blocks are commonly used for this purpose; however, as gauge blocks typically have set measurements, the use thereof tends to require a multitude of different-sized blocks for each different measurement. Further, precision gauge blocks may tend to be expensive and may likely include unnecessary or unwanted blocks when purchasing as a set. In addition, as a gauge block set includes numerous pieces, it is common for one or more blocks to be lost or misplaced, therefore rendering at least part of the set unusable. It is a particular problem in these scenarios that the most commonly misplaced or lost gauge blocks tend to be the gauge blocks that are utilized the most, thus further exacerbating the issue.

SUMMARY

The present disclosure addresses these and other issues by providing an adjustable gauge block that may be quickly adjusted to a desired height and then dialed in to a precision measurement that can replace a set of gauge blocks. The adjustable gauge block of the present disclosure may be further used as a repeatable and precise physical reference to set tool depths and heights. The adjustable gauge block of the present disclosure may be utilized as a physical reference to set drill press bit depths, table saw blade heights, router table bit heights, and the like. Additionally, the adjustable gauge block of the present disclosure may be utilized to check uniformity of thickness along an edge of a piece of stock.

In one aspect, an exemplary embodiment of the present disclosure may provide an adjustable gauge block comprising: a triangular base defining a central channel in a top surface thereof; a slider assembly having a reference plate on a first end thereof, the slider assembly carried by the base and slidably engaged within the central channel thereof; a quick adjustment button operably connected to the slider assembly; and a threaded rod within the central channel of the base operable to engage a flange of the quick adjustment button; wherein the quick adjustment button is movable from a first position wherein the flange thereof is engaged with the threaded rod and the slider assembly is prevented from movement relative to the base and a second position wherein the flange is disengaged from the threaded rod and the slider assembly is movable relative to the base.

In another aspect, and exemplary embodiment of the present disclosure may provide a method of measuring a height above a surface comprising: placing a base of an adjustable gauge block on a work surface from which the height is to be measured; moving a slider assembly of the adjustable gauge block from a first position wherein a bottom surface of a reference plate on the slider assembly is coplanar with a bottom of the base to a second position wherein the bottom surface is substantially parallel to and above the bottom of the base; and determining the height of the bottom surface of the reference plate relative to the work surface with a scale on a top surface of the base of the adjustable gauge block based on the position of an edge of the slider assembly relative to the scale.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
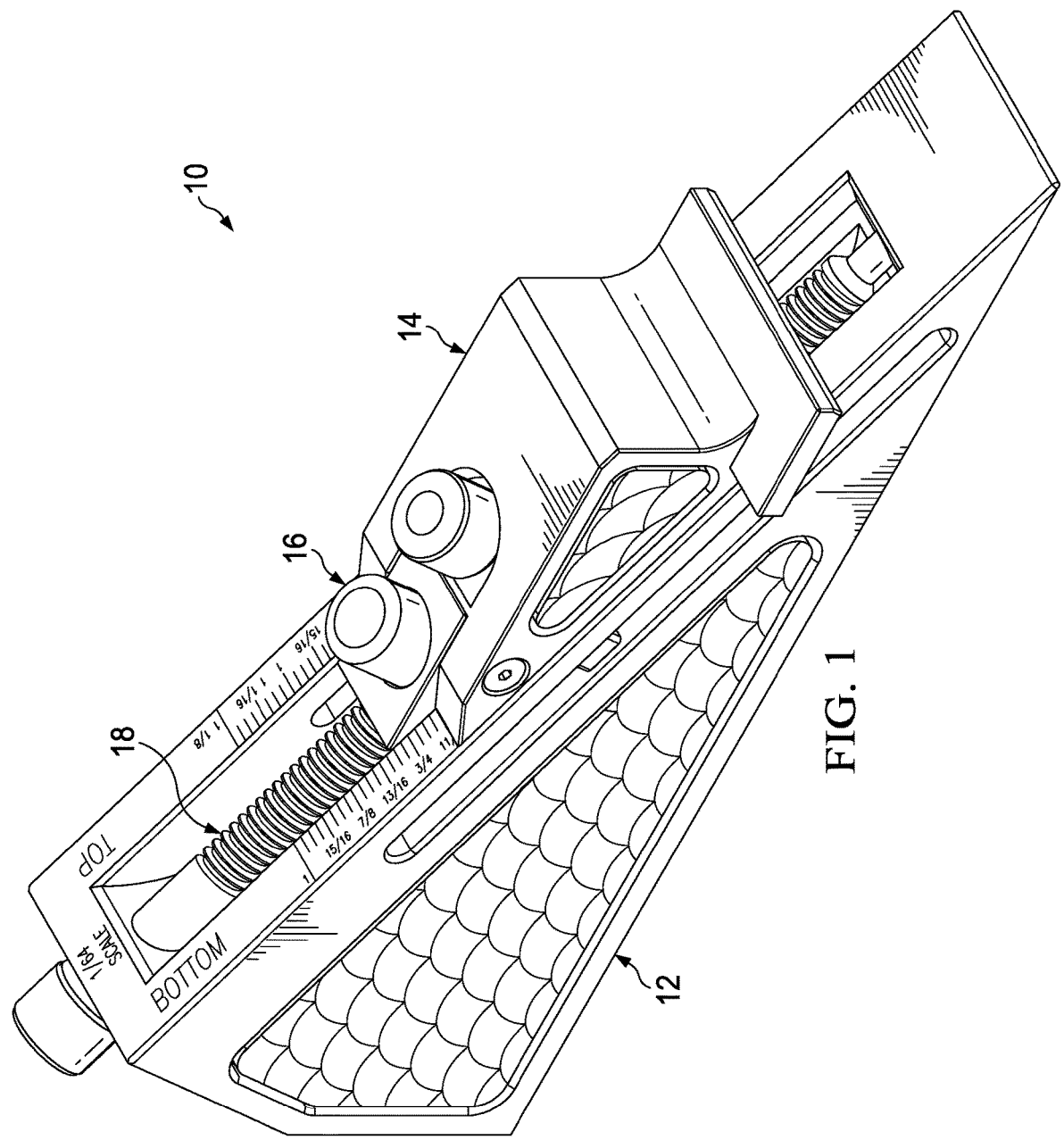
FIG. 1 is a top side perspective isometric view of an adjustable gauge block according to one aspect of the present disclosure.
Figure 2:
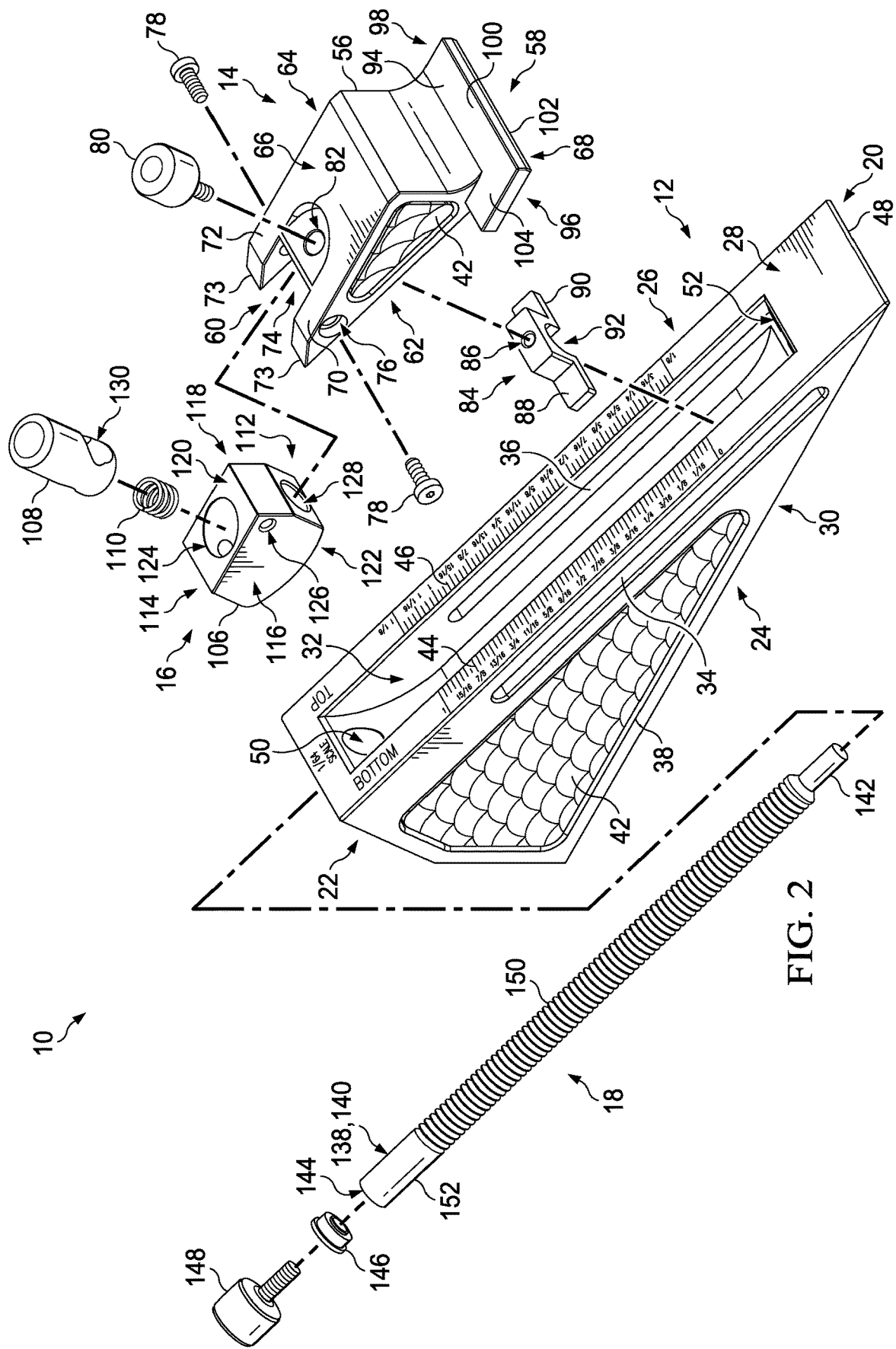
FIG. 2 is a top side perspective isometric exploded view of an adjustable gauge block according to one aspect of the present disclosure.
Figure 2A:
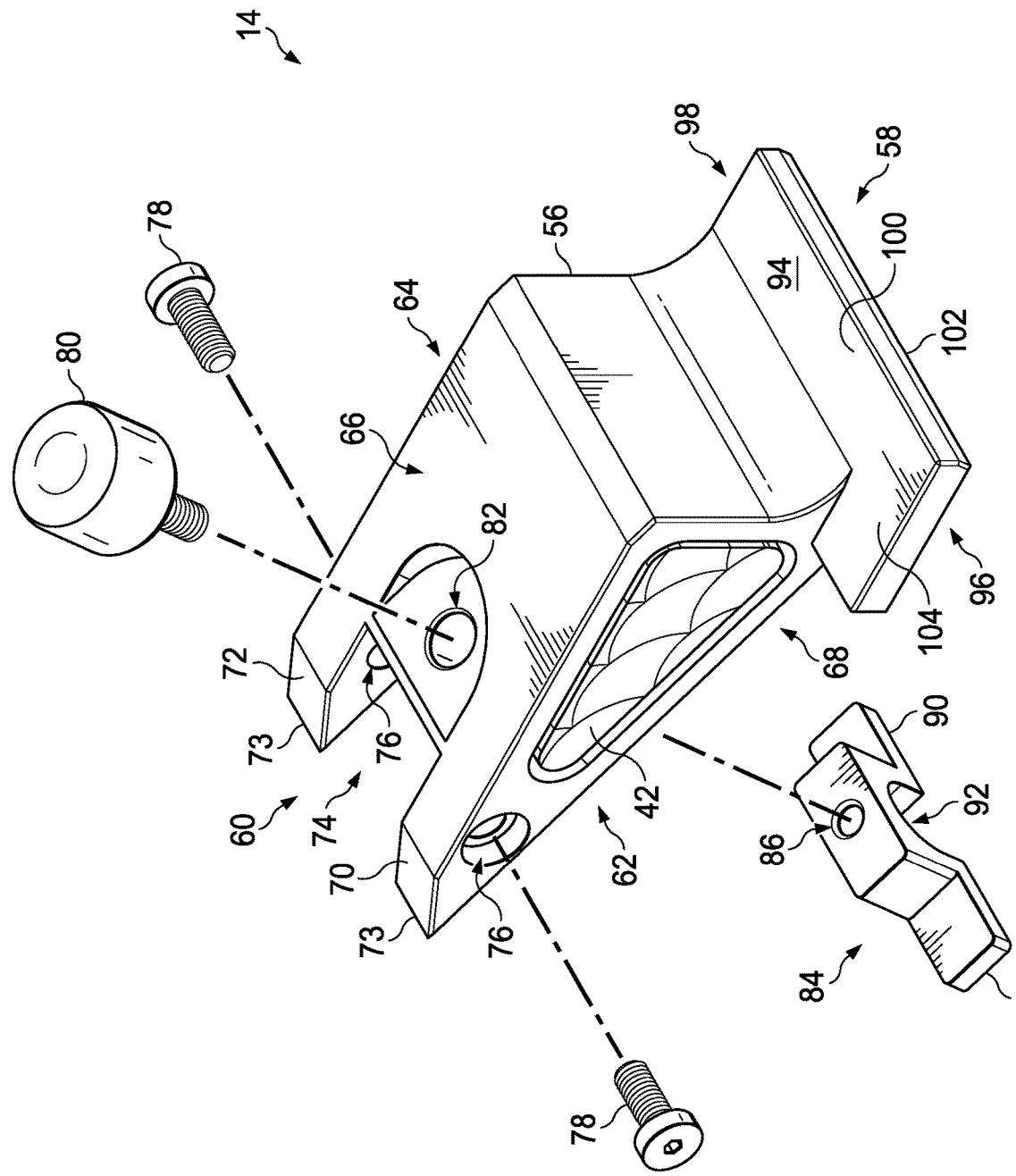
FIG. 2A is a top side perspective exploded view of a slider assembly according to one aspect of the present disclosure.
Figure 2B:
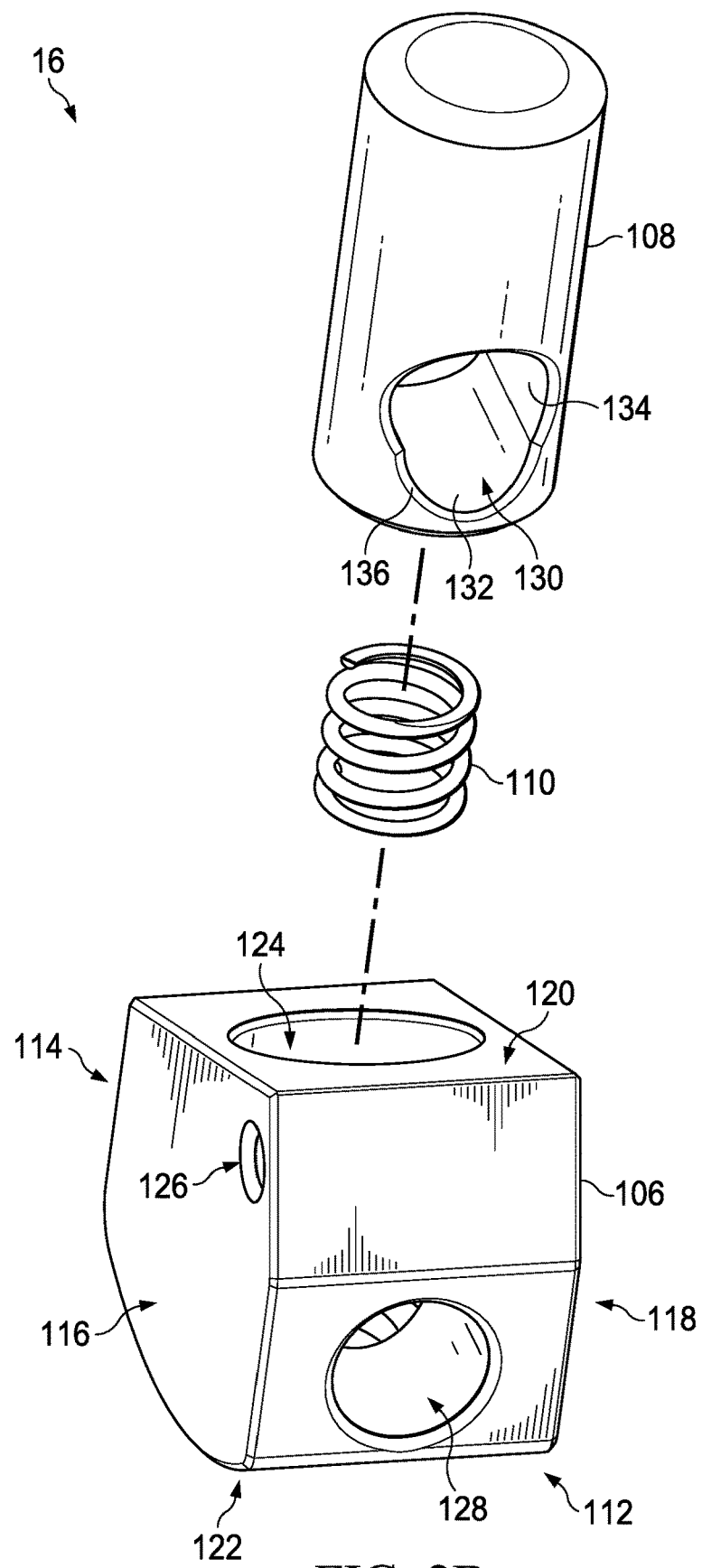
FIG. 2B is a top side perspective exploded view of a quick adjustment assembly of an adjustable gauge block according to one aspect of the present disclosure.
Figure 3:
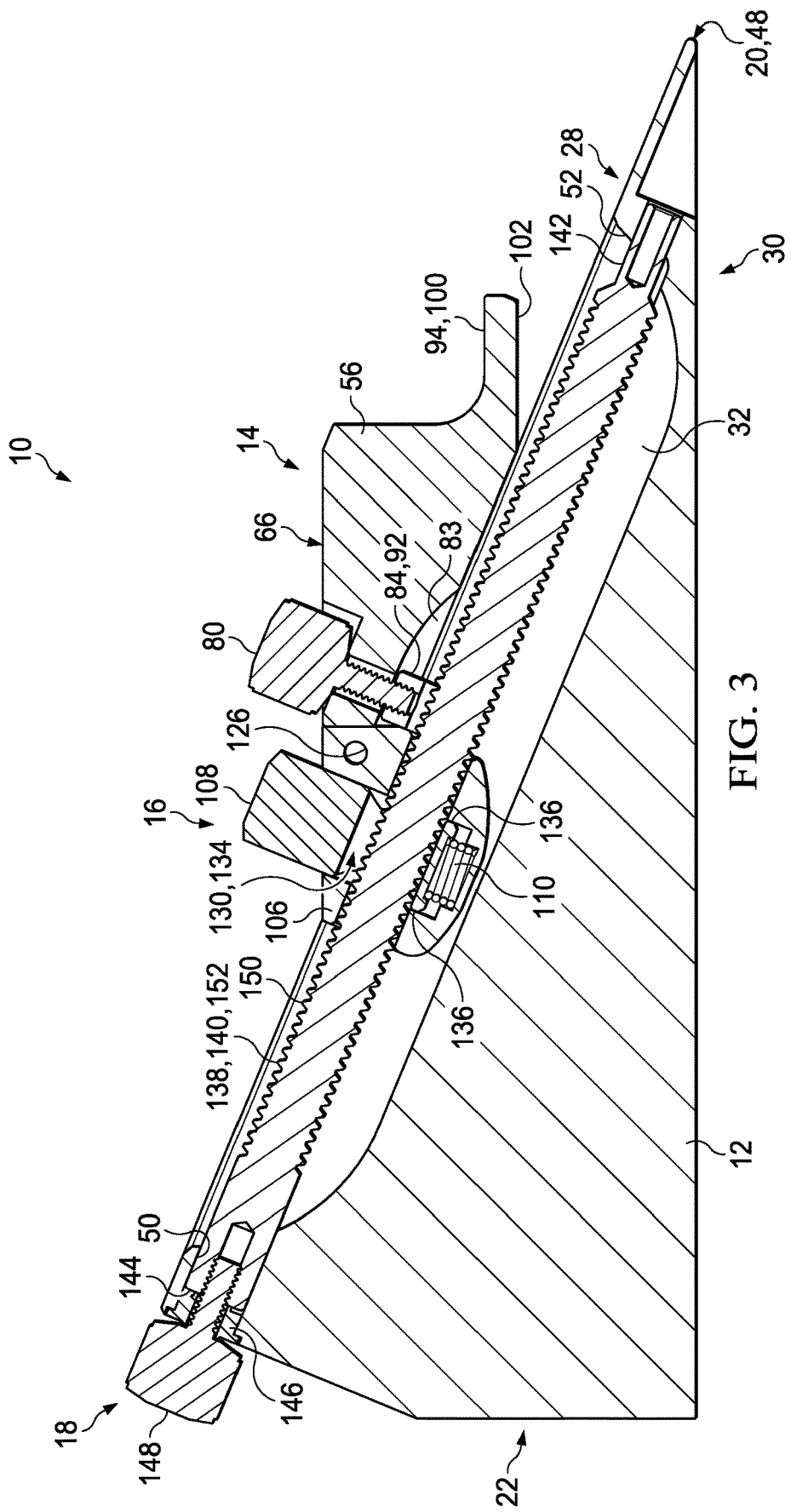
FIG. 3 is a side elevation cross section view of an adjustable gauge block according to one aspect of the present disclosure.

With reference to FIGS. 1-3, an adjustable gauge block is shown and generally indicated at reference 10. Adjustable gauge block, or simply gauge block 10, may generally include a base 12, a slider assembly 14, a quick adjustment assembly 16, and a micro-adjustment assembly 18.

Base 12 may have a first end 20 spaced apart from a second end 22 defining a longitudinal direction therebetween and a first side 24 spaced apart from a second side 26 defining a transverse direction therebetween. Base 12 may also have a top 28 spaced apart from a bottom 30 defining a vertical direction therebetween. Base 12 may be generally triangular-shaped as discussed further herein and may further include a central channel 32 defined in the top 28 thereof. Bottom of base 30 is contemplated to be the surface of base 12 that may interact with a work surface 162, such as a bench top, table top, table saw surface, drill press block, or other similar work surfaces 162. Bottom 30 may therefore be substantially parallel with the work surface 162.

Central channel 32 may be in communication with a first side slot 34 defined through first side 24 and a second side slot 36 defined through second side 26 for operational engagement with slider plate 84 discussed further herein. Central channel 32 may be defined in base 12 but may be only partially formed therethrough, wherein first and second side slots 34 and 36 may be defined through the entire thickness of first side and second side 24 and 26, respectively.

Base 12 may further include a first side recess 38 and a second side recess 40 on each of first and second sides 24 and 26, respectively. Recesses 38 and 40 may have or include one or more inserts 42, which may be decorative inserts 42, placed therein. Alternatively, recesses 38 and 40 may be unadorned or omitted where desired.

Base 12 may be formed of any suitable material including, but not limited to, steel, stainless steel, anodized aluminum, aluminum, other metals, plastics, polymers, or the like, and may be treated or coated for any desired property, including but not limited to, rust prevention, corrosion prevention, antifriction, aesthetic coatings such as paint or enamel, or any other suitable coatings or materials as desired.

Base 12 may further include a first scale 44 and a second scale 46, which may be printed, screen printed, engraved, or the like on top 28 on either side of central channel 32, as shown in the figures and discussed further herein. First scale 44 may be the scale on first side 24 of channel 32 and may be a scale relating to a bottom surface 102 of reference plate 94, as discussed further herein. Similarly, second scale 46 may be on second side 26 of channel 32 and may be a scale relating to a top surface 100 of reference plate 94, as discussed further below. According to another aspect, first and second scales 44 and/or 46 may be relative to either surface of reference plate 94 and may further be provided on either side of base 12, as desired. According to another aspect, one or both scales 44 and/or 46 may be omitted, or gauge block 10 may include additional scales, where desired.

In particular, according to one example, first scale 44 may be a bottom scale and may represent the position of bottom surface 102 of reference plate 94 relative to a work surface 162 on which gauge block 10 is being utilized. First scale 44 may have a range of 0" to 1". Second scale 46 may be a top scale in that it may represent the position of top surface 100 of reference plate 94 relative to the work surface 162. Second scale 46 may extend from approximately ⅛" to 1⅛", providing the vertical thickness of reference plate 94, in this example, may be ⅛". According to another aspect, any reference scales may be utilized for first and second scales 44 and 46 as desired or dictated by the desired implementation. Similarly, reference plate 94 may be any suitable or desired vertical thickness provided first and second scales 44 and 46 include an offset to account for the thickness of reference plate 94. According to another aspect, first and second scales may be provided in metric measurement, or may include both imperial and metric measurements, where desired.

As base 12 may be generally triangular in shape, base 12 may further include a front edge 48, which may be or represent the point of the triangle and may be disposed at first end 20 and opposite second end 22. The angle of the base 12, as measured at the front edge 48 (e.g., the angle of top 28 relative to bottom 30, and therefore the angle of the top 28 above the work surface 162) may be provided at any suitable or desired angle. According to one aspect, base 12 may have an angle ranging from 15° to 45°. According to another aspect, base 12 may be angled at approximately 22.5°. It will be understood that while the angle of base 12 does not have an overall effect on the function and use of gauge block 10, lower angles may allow for the first and second scales 44 and 46 to be spread out which may therefore allow a higher measure of precision; however, it will be further understood that other angles may be utilized while still providing a suitable measure of precision therewith.

Base 12 may further include a through aperture 50 defined through second end 22 thereof representing a pass-through aperture for adjustment rod 138, as described further below. In particular, adjustment rod 138 may pass through aperture 50 and into the interior of central channel 32. Base 12 may further include a front face 52 within central channel 32 at first end 20 of base 12. Front face 52 may further include a pin aperture 54 partially defined therein allowing for operable engagement with the tip 142 of adjustment rod 138, as discussed further below.

Slider assembly 14 may include a slider body 56 having a first end 58 spaced longitudinally apart from a second end 60, a first side 62 spaced transversely apart from a second side 64, and a top 66 spaced vertically apart from a bottom 68. Bottom 68 of slider body 56 may be angled to allow for slidable engagement with base 12, and may include a slider plate cavity 83 therein, as discussed further below. Slider body 56 may have a first arm 70 spaced transversely apart from a second arm 72 further defining a central opening 74 therebetween. First and second arms 70 and 72 and central opening 74 may be at second end 60 of slider body 56 and may allow operable engagement with quick adjustment assembly 16. First and second arms 70 and 72 may further define an edge 73 at the second end 60 of slider body 56. This edge 73 may be the or otherwise define the reference point to indicate the position of slider body 56 (or more particularly the position of reference plate 94) relative to scales 44 and/or 46.

Slider body 56 may further include one or more screw apertures 76 and screws 78, which may be operable to secure slider body 56 and quick adjustment assembly 16 together. Slider assembly 14 and/or slider body 56 may further include an adjustment knob 80, an adjustment knob aperture 82, slider plate cavity 83, and a slider plate 84 with slider plate aperture 86.

Adjustment knob 80 may be a thumbscrew or the like and may be textured or otherwise coated to assist with the grip thereof. Adjustment knob 80 may extend through aperture 82 and into aperture 86 of slider plate 84 for engagement therewith. According to one aspect, adjustment knob 80 may be externally threaded and aperture 86 may be internally threaded to allow for engagement therebetween.

Slider plate 84 may have a first flange 88 and a second flange 90 for slidable engagement in first side slot 34 and second side slot 36 as discussed further below. Slider plate 84 may have a raised central portion 92, which may be curved or arched to provide clearance over the body 140 of adjustment rod 38 as described further below. This may allow slidable movement of slider body 56 and slider plate 84 relative to adjustment rod 138 as will be discussed below. Central portion 92 may extend upwards into slider plate cavity 83, which may be a generally hollow opening in the bottom 68 of slider body 56 which may allow slider assembly 14 and base 12 to engage with further allowing slidable movement therebetween.

Slider body 56 may be constructed of any suitable material including similar materials as used for base 12. According to one aspect, slider body 56 and base 12 may be constructed of the same material and may include similar features, such as decorative plates 42 and/or coatings or finishes as previously described herein. As mentioned above, slider body 56 may have an angled bottom surface 68 relative to top 66 to be opposite but complementary to the angle of base 12 to allow flush and slidable engagement therebetween. Further, top 66 of slider body 56 may be generally horizontal and parallel to bottom 30 of base 12.

First end 58 of slider body 56 may further include a reference plate 94 thereon having a first side 96 and a second side 98 spaced transversely apart therefrom. Reference plate 94 may further include a top surface 100 spaced vertically apart from a bottom surface 102. The distance between top surface 100 and bottom surface 102 may define the vertical thickness of reference plate 94 as discussed further below. Both top surface 100 and bottom surface 102 of reference plate 94 may be substantially parallel to each other and substantially parallel to the bottom of base 12, regardless of the position of slider assembly 14 on base 12.

First side 96 of reference plate 94 may extend beyond first side 62 of slider body 56 and first side 24 of base 12 to provide a reference plate flange 104 for engagement with various tools or woodworking components as discussed further below. Reference plate 94 may be fixedly attached to slider body 56 or may alternatively be integrally formed therewith as to form a portion of slider body 56. As discussed further below in regards to the operation of gauge block 10, reference plate 94 may provide the primary surfaces (i.e. top and bottom surfaces 100, 102) and components of gauge block 10 for use in measuring or setting tool depths and/or heights and the like.

Reference plate flange 104 may extend past the first side 24 of base 12 to allow the bottom surface 100 of reference plate 94 to interact with tools operating below a piece of stock, such as a table saw, router table, or the like. By extending beyond the side 24 of base 12, reference plate flange 104 may allow gauge block to be placed alongside a tool or a piece of stock to allow measurement of the height of the tool or stock above the work surface 162, as discussed further herein.

Quick adjustment assembly 16 may include an adjustment body 106, a quick adjust button 108, and a biasing spring 110. Adjustment body 106 may have a first end 112 corresponding to first end 58 of slider body 56 and spaced longitudinally apart from a second end 114. Adjustment body 106 may likewise include a first side 116 spaced transversely apart from a second side 118 corresponding to first and second sides 62 and 64 of slider body 56. Similarly, adjustment body 106 may have a top 120 spaced vertically apart from a bottom 122. Slider body 106 may include a number of through holes and/or apertures defined therein for operational engagement with the other components of quick adjustment assembly 16 and/or gauge block 10. In particular, adjustment body 106 may include a quick adjustment button aperture 124, which may contain biasing spring 110 and quick adjust button 108 therein as described further below. Additionally, adjustment body 106 may include one or more screw apertures 126 corresponding to screw apertures 76 of slider body 56. Adjustment body 106 may further include a micro-adjustment aperture 128 running longitudinally through adjustment body 106, which may be sized to allow adjustment rod 138 to extend therethrough, as discussed further below.

Quick adjustment button 108 may likewise include a corresponding slider aperture defined longitudinally therethrough having a lower portion 132 and an upper portion 134. Lower portion 132 may further include a flange 136 for operable engagement with threads 150 of adjustment rod 138 while upper portion 134 of slider aperture 130 may be sized to permit free movement of slider assembly 14 and quick adjustment assembly 16 relative to adjustment rod 138, as discussed further below.

Adjustment body 106 and quick adjust button 108 may be formed of any suitable material including similar or complementary materials to base 12 and slider assembly 14 as previously discussed herein. Quick adjustment assembly 16, or more particularly, adjustment body 106 may be sized to fit between first and second arm 70 and 72 of slider body 56 and within central opening 74 thereof. Similarly, quick adjustment assembly 16 may be sized to fit within central channel 32 of base 12 for slidable engagement therein as discussed further below.

Accordingly, the horizontal or transverse width of base 12 should be roughly equal to the width of slider body 56 (excluding flange 104 of reference plate 94 as discussed herein) while quick adjustment assembly 16, central channel 32, and central opening 74 may be similarly sized to allow slidable engagement therebetween. Similarly, central portion 92 of slider plate 84 may be sized to allow movement relative to adjustment rod 138, as previously discussed herein, but may also be sized to fit within central channel 32 of base 12. The positional relationship of the components of gauge block 10 may be further understood with reference to the operation thereof as discussed further below.

Micro-adjustment assembly 18 may generally include a threaded adjustment rod 138, which may extend through screw aperture 50 in base 12, micro-adjustment aperture 128 in adjustment body 106, slider aperture 130 in quick adjust button 108, and into pin aperture 54 defined in surface 52 of base 12.

Specifically, adjustment rod 138 may have a body 140 which may include a tip 142, which may be the portion of adjustment rod 138 engaged within pin aperture 54. Adjustment rod 138 may further include a head 144, which may operationally connect to, or be in operational communication with, a ball bearing assembly 146 and an adjustment knob 148. The adjustment knob 148 may be similar to adjustment knob 80 in that it may be a thumbscrew or the like and may be textured or otherwise coated for ease of use thereof.

Body 140 may further include a plurality of threads 150 which may operably engage flange 136 of quick adjust button 108. Body 140 of adjustment rod 138 may also include an unthreaded portion 152 adjacent the head 144 thereof. This unthreaded portion 152 may sit (entirely or in part) within aperture 50 in base 12 and may allow free rotation of adjustment rod 138 therein. Similarly, tip 142 of adjustment rod 138 may likewise be unthreaded to allow rotational engagement within pin aperture 54. Bearing 146 may likewise fit within aperture 50 to further facilitate the rotational movement of adjustment rod 138

Adjustment rod 138 may be formed of any suitable material and may be sized to extend from face 52 at first end 20 of base 12 through aperture 50 and extending beyond second end 22 of base 12. The full extension beyond second end 20 of base 12 may substantially consist of adjustment knob 148.

Threads 150 of adjustment rod 138 may be sized according to the desired length of first and second scales 44 and 46. In particular, threads 150 may be provided such that a single rotation of adjustment rod 138 may move slider assembly 14 a predetermined distance forward or backwards on base 12 to allow for fine adjustment and precise measurement utilizing gauge block 10. According to one aspect, the threads 150 may be ¼-32 thread where first scale 44 is 0" to 1" and second scale 46 is ⅛" to 1⅛". According to another aspect, threads 150 may be any suitable thread type or size as dictated by the desired implementation.

Having thus described the elements and components of gauge block 10, the operation and use thereof will now be discussed.

With reference to FIGS. 3-7, gauge block 10 is contemplated for use with a multitude of woodworking tools, particularly those wherein a distance from a work surface 162 or a work piece/piece of stock is desired to be precisely and repeatedly measured. According to one example, gauge block 10 is contemplated for use in setting heights and depths of various woodworking tools. Further according to this example, top surface 100 of reference plate 94 may be utilized to set depths of tools operating above a piece of stock, such as a drill press, handheld routers, and the like, while bottom surface 102 of reference plate 94 may be utilized to set heights or depths of woodworking tools operating below a piece of stock, such as table saws, router tables, and the like. As discussed further below, the configuration and operation of gauge block 10 may allow for precise and repeatable measurement to allow quick tool adjustments, precise measurement of multiple tools, and/or quick and repeatable measurements to be performed.

Figure 4:
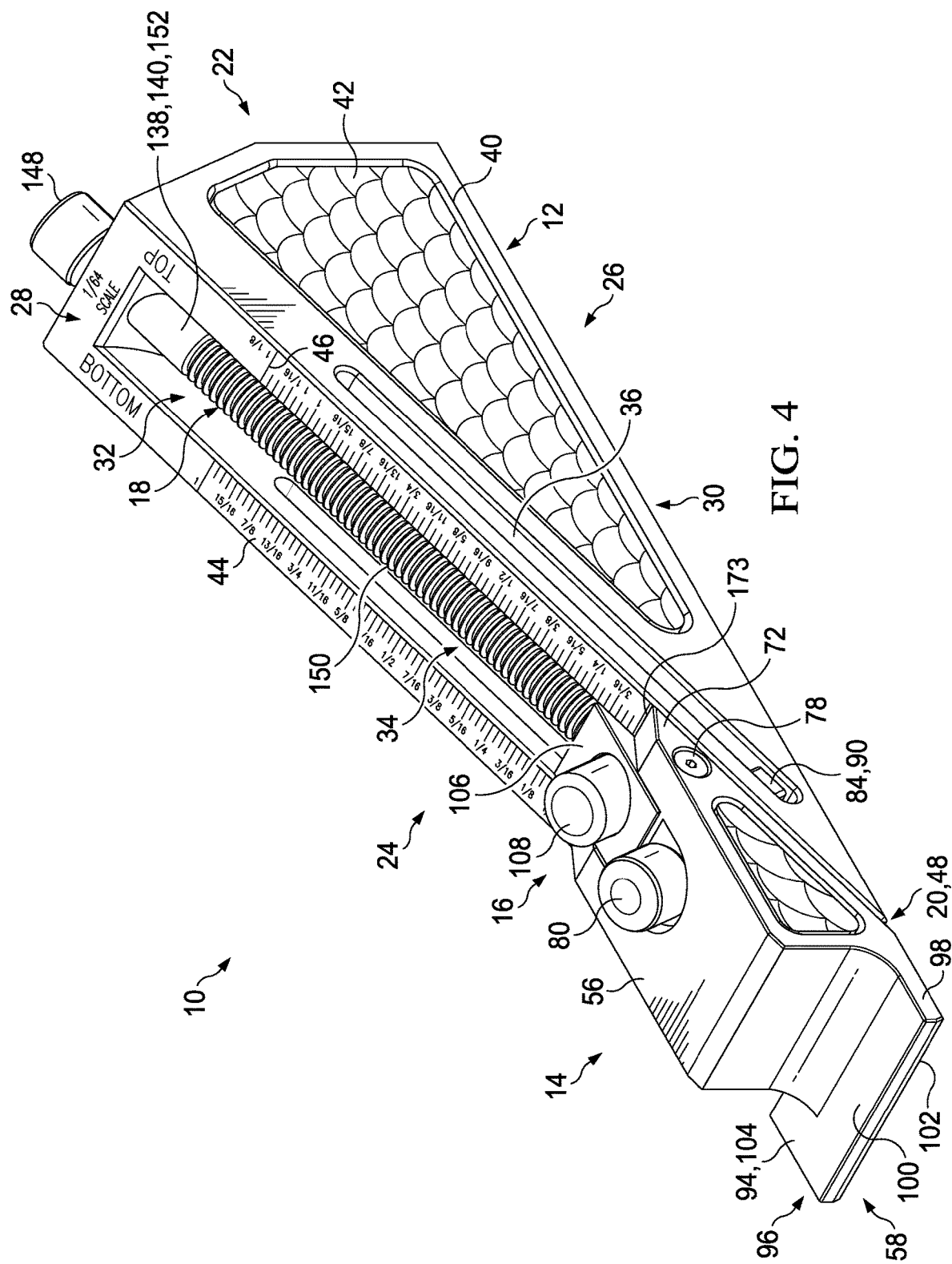
FIG. 4 is a top side perspective isometric operational view of the adjustable gauge block according to one aspect of the present disclosure.

With reference to FIG. 4, the general operation of gauge block 10 will now be described. In particular, as seen in FIG. 4, slider assembly 14 may be slidable to any specific point between a first position, or zero position, wherein the bottom surface 102 of reference plate 94 is flush with the work surface 162 on which gauge block 10 is being utilized. In this configuration, the bottom surface 102 of reference plate flange 104 and bottom 30 of base 12 may be substantially coplanar.

Slider assembly 14 may then be raised from this zero position to any suitable or desired second position on base 12 by depressing the quick adjust button 108 against biasing spring 110 to disengage flange 136 of quick adjust button 108 from threads 150 of adjustment rod 138. With flange 136 disengaged from threads 150, slider assembly 14 may be freely moved relative to base 12 as adjustment rod 138 does not hinder the movement thereof with quick adjust button 108 depressed. Slider assembly 14 may be moved to an approximate position as measured by the location of edges 73 of first and second arms 70 and 72 on the first and/or second scales 44 and/or 46. In any position other than the "zero position," reference plate 94 may be above the bottom surface 30 of base 12 and remain substantially parallel thereto.

When moved to the desired position relative to first and/or second scales 44 and/or 46, the quick adjustment button 108 may be released wherein biasing spring 110 may cause flange 136 to re-engage with threads 150 of adjustment rod 138. As the flange 136 is limited in the positioning based on the distance between threads 150 of adjustment rod 138, the quick adjustment assembly 14 may be or other provide coarse adjustment of slider assembly. Put another way, the precision of the quick adjustment aspect of adjustable gauge block 10 is slightly limited by the thread size of threads 150 of adjustment rod 138. Accordingly, the re-engagement of flange 136 with threads 150 may cause the slider assembly 14 to move slightly such that edges 73 of first and/or second arm 70 and/or 72 may not properly align in the exact desired position based on the rotational position of adjustment rod 138. At this point, adjustment knob 148 may be utilized to turn adjustment rod 138 clockwise or counterclockwise to provide a fine micro-adjustment of slider assembly 14, thus aligning edges 73 of first and/or second arms 70 and/or 72 in the precise position on first and/or second scales 44 and/or 46 as desired. This, in turn, may precisely position reference plate 94 relative to the work surface 162.

When in the desired position, first scale 44 may again represent the height of bottom surface 102 of reference plate 94 above the work surface 162 as indicated by the edge 73 of first arm 70 on first scale 44. Similarly, the edge 73 of second arm 72 may indicate the height of the top surface 100 of reference plate 94 relative to the work surface 162 on the second scale 46. If desired, as contemplated for use in repeatable measurements, slider assembly 14 may be locked into its position by tightening adjustment knob 80 and slider plate 84 thereby causing central portion 92 of slider plate 84 to press against body 140 of adjustment rod 138 to prevent slidable movement relative thereto. Engaging slider plate 84 with adjustment rod 138 may further cause first and second flanges 88 and 90 of slider plate 84 to likewise engage with first and second side slots 34 and 36 to further prevent slidable movement of slider body 56 relative thereto. When it is desired to then move slider body 56 to a new position, adjustment knob 80 may be rotated to loosen and therefore disengage slider plate 84 from adjustment rod 138 and/or side slots 34 and 36, and slider assembly 14 may then be moved by again depressing the quick adjust button 108 and moving the slider body 56 as desired. Alternatively, where only small adjustments or movements are desired, slider assembly 14 may be adjusted entirely through use of micro-adjustment assembly 18.

Figure 5A:
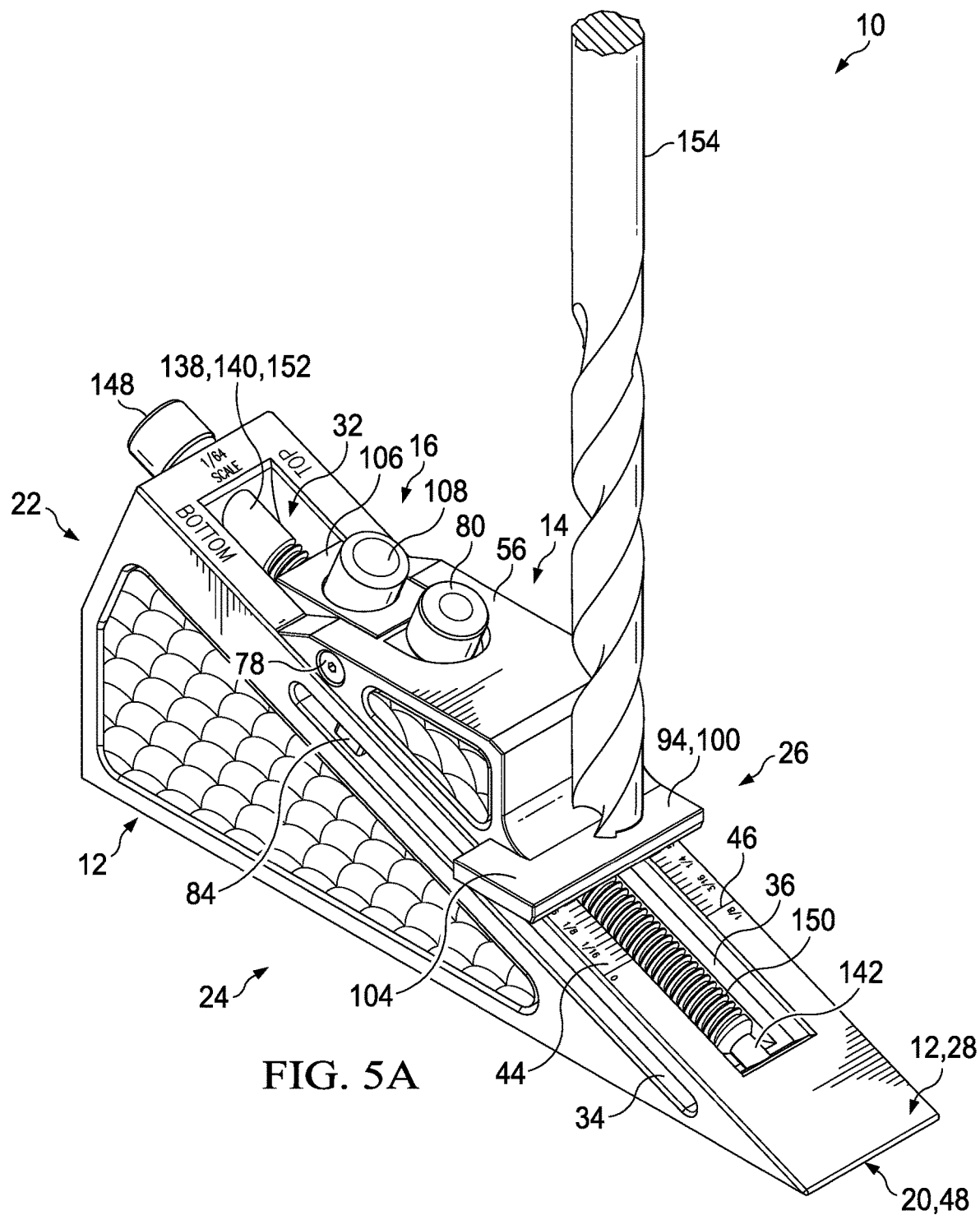
FIG. 5A is a top side perspective isometric operational view of an adjustable gauge block utilized in setting a drill press bit depth according to one aspect of the present disclosure.
Figure 5B:
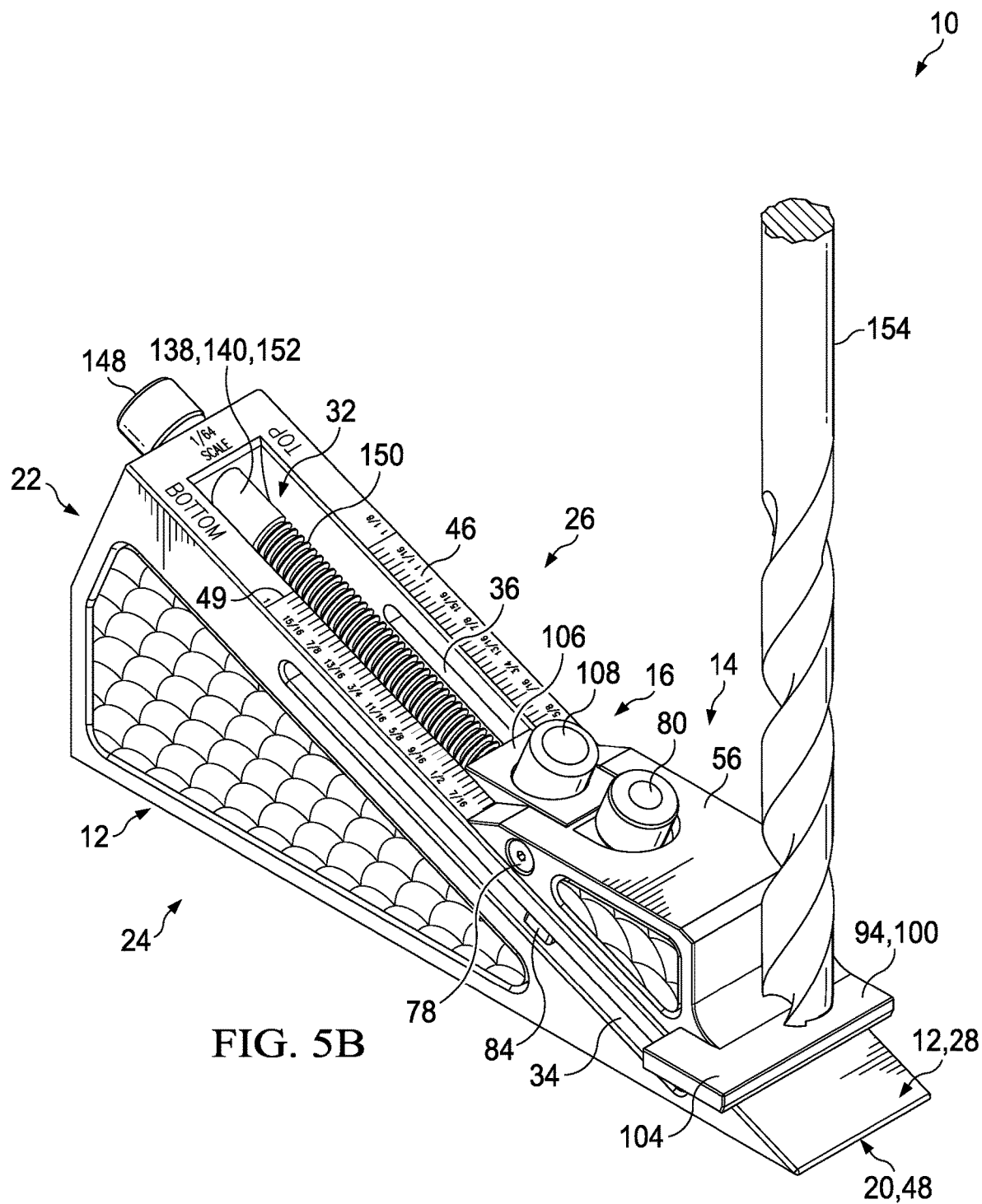
FIG. 5B is a top side perspective isometric operational view of an adjustable gauge block utilized in setting a drill press bit depth according to one aspect of the present disclosure.

With reference to FIGS. 5A and 5B, an exemplary use of gauge block 10 is depicted as used to set the depth of a drill bit 154 being utilized with a drill press or similar woodworking apparatus. As depicted in FIG. 5A, slider assembly 14 may be moved such that top surface 100 of reference plate 94 is in the desired position relative to the work surface 162. According to the example provided previously herein wherein reference plate 94 is ⅛" thick, FIG. 5A shows the slider assembly 14 at its highest position wherein first scale provides that the bottom surface 102 of reference plate 94 is 1" above work surface 162 while second scale 46 may provide that top surface 100 is precisely 1⅛" above the work surface 162.

If it is desirable to repeatedly place bits 154 at this exact height, for example, in instances of changing to different bits having different sizes, slider assembly 14 may be locked into position with adjustment knob 80 and slider plate 84, and reference plate 94 may be used to place subsequent bits 154 within a drill press ensuring an identical depth placement thereof.

With reference to FIG. 5B, further according to this example, where it is desirable to change the depth of a bit 154, the adjustable gauge block 10 may be utilized to provide a new depth by again moving slider assembly 14 to a second desired position, as measured by edges 73 of first and/or second arms 70 and/or 72 on first and/or second scales. In this second position, the edges 73 of first arm 100 and second arm 72 may again indicate the position of the bottom surface 102 and the top surface 100 relative to the work surface 162, respectively. In the first, second, and/or any subsequent positions, the precise position may be dialed in using the micro-adjustment assembly 18 to effect precise movement of slider assembly 14 relative to base 12.

As with the drill bit 154, other tools operating on top of, or above, the piece of stock may be adjusted and placed according to similar methods. Similarly, other measurements wherein any other object is desired to be placed at a precise height above a surface may be performed using gauge block 10 and top surface 100 of reference plate 94 in a similar manner.

Figure 6:
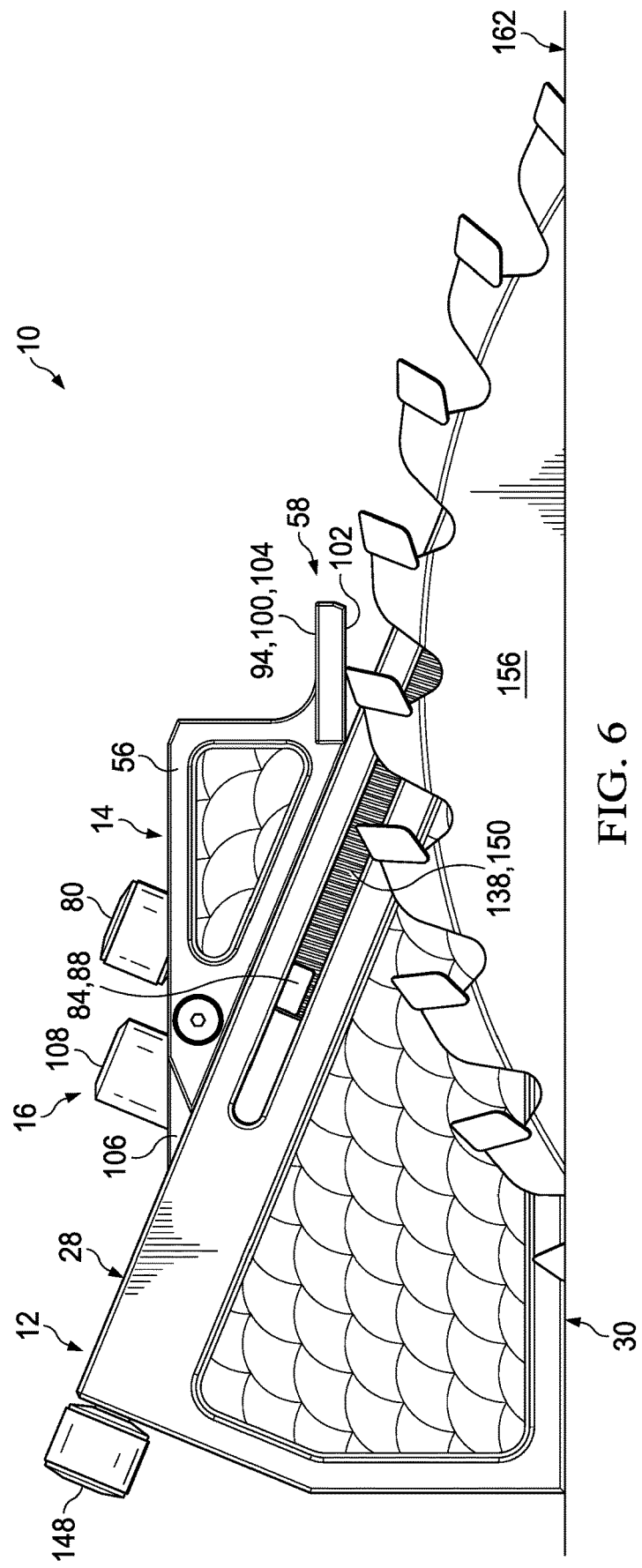
FIG. 6 is a side elevation operational view of an adjustable gauge block as used to set a table saw blade height according to one aspect of the present disclosure.

With reference to FIG. 6, gauge block 10 may be similarly employed to set the height of tools operating below a piece of stock, such as a table saw blade 156 (as shown) in a similar manner as setting the depth of a drill bit 54; however, with tools operating below the piece of stock, the bottom surface 102 of reference plate 94 may be utilized in setting the height thereof. As shown, according to one example, a table saw blade 156 working from beneath a piece of stock may be raised until the highest tooth thereof is in contact with the bottom surface 102 of reference plate 94. As with drill bits 154 above, when setting heights above the work surface 162, as shown here, the slider assembly 14 may be locked into position with adjustment knob 80 and slider plate 84 for repeatable measurements. Alternatively, when it is desired to change the height of a tool, or measure a different height, slider assembly 14 may be moved between desired positions in a similar manner as described above.

Figure 7A:
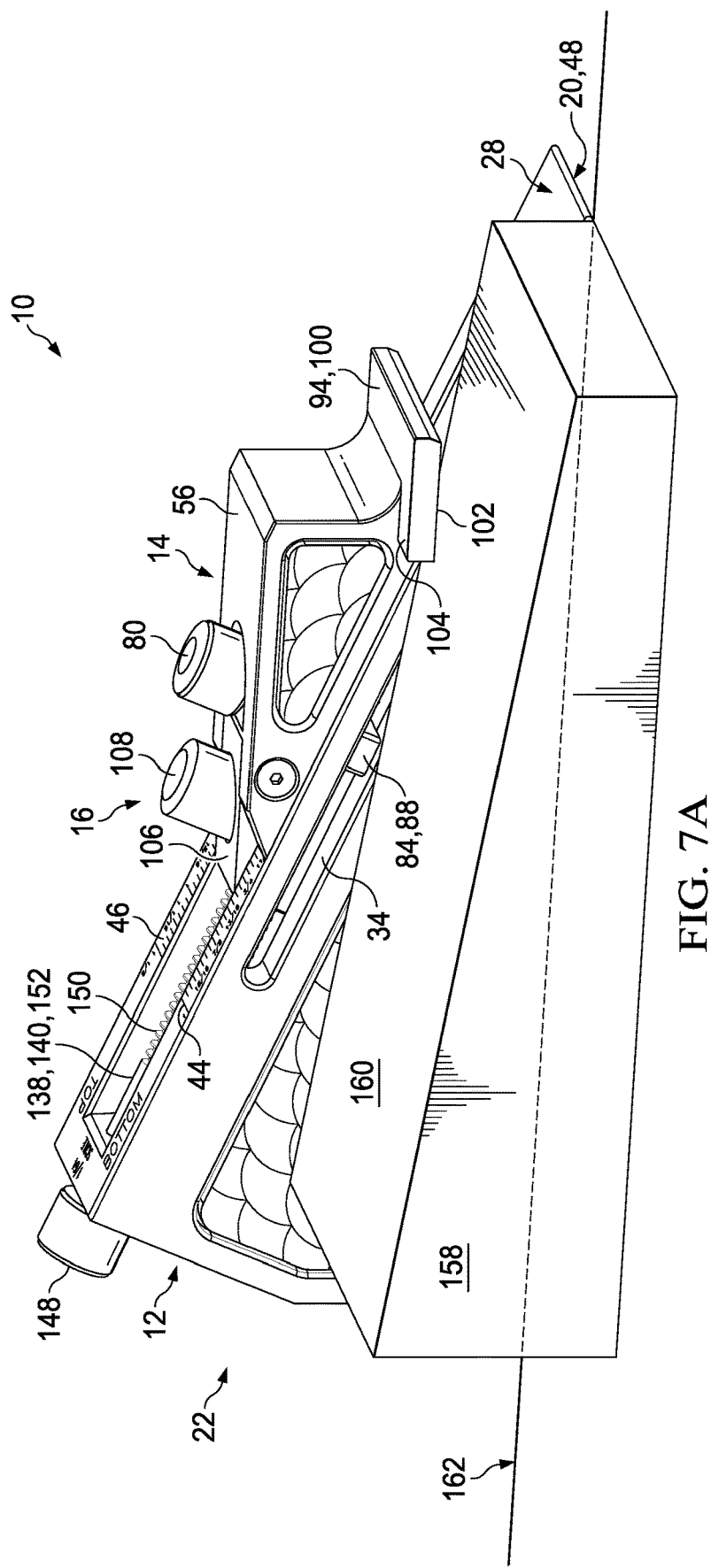
FIG. 7A is a side perspective isometric operational view of an adjustable gauge block measuring the uniformity of thickness of a piece of stock according to one aspect of the present disclosure.
Figure 7B:
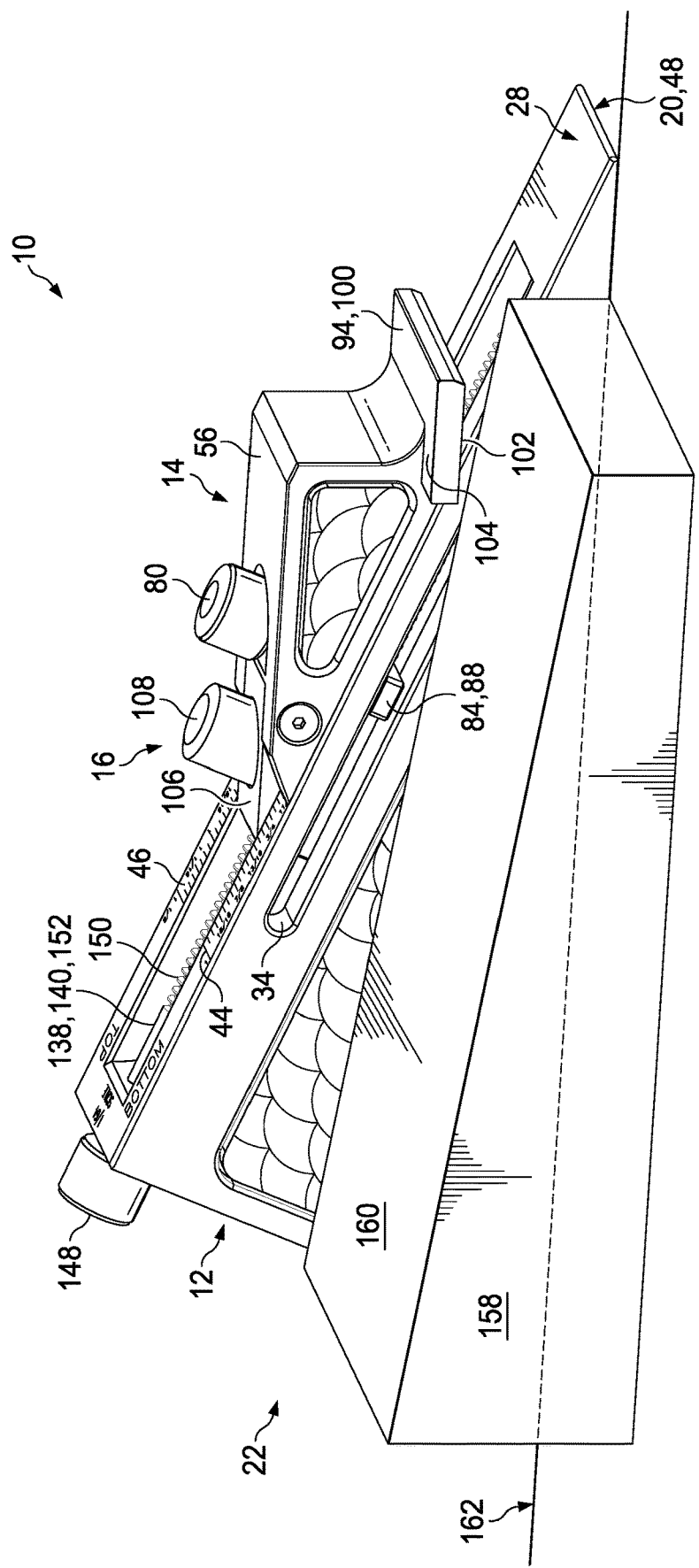
FIG. 7B is a side perspective isometric operational view of an adjustable gauge block measuring the uniformity of thickness of a piece of stock according to one aspect of the present disclosure.
Figure 7C:
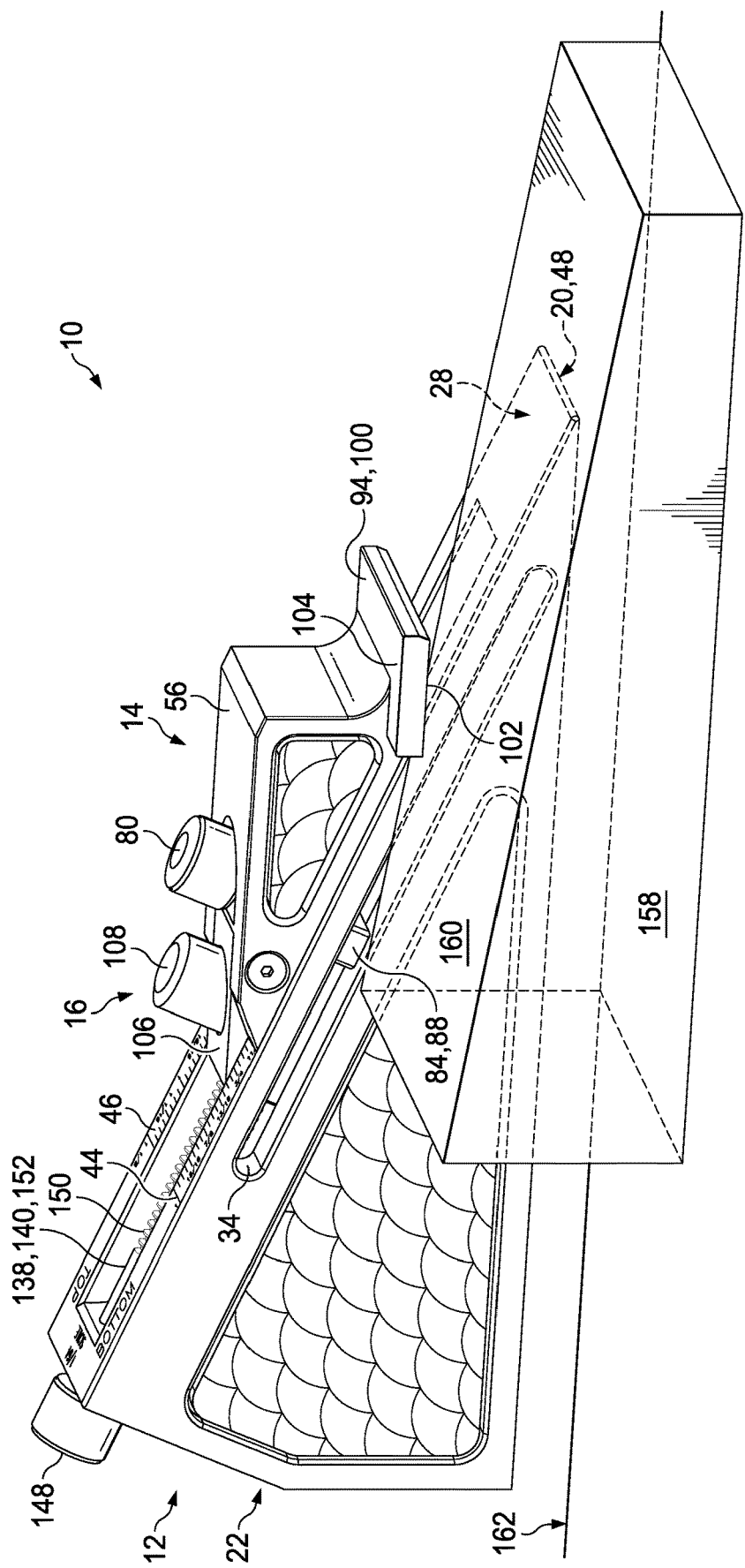
FIG. 7C is a side perspective isometric operational view of an adjustable gauge block measuring the uniformity of thickness of a piece of stock according to one aspect of the present disclosure.

With reference to FIGS. 7A-7C, an additional use and advantage provided by gauge block 10 is the ability to check the uniformity of thickness along an edge of a piece of stock 158. As shown, the piece of stock 158 has an exaggerated variance in thickness. This is shown for illustrative purposes and it will be understood that a piece of stock 158 utilized in actual woodworking applications may have any variance, including no or little variance, or variance that is not as extreme as that which is depicted herein.

Accordingly, slider assembly 14 may be set such that the bottom surface 102 of reference plate flange 104 may be in contact with a top surface 160 of the piece of stock 158 at any desired point along the edge thereof. In particular, the bottom 102 of the flange 104 of reference plate 94 may sit against or in contact with the top surface 160 of the piece of stock 158. The gauge block 10 may then be run along the edge of the piece of stock 158 towards the first end 20 of base 12 (FIG. 7B) or the second end 22 of base 12 (FIG. 7C).

With reference to FIG. 7B, where a gap is seen between the top surface 160 of the piece of stock 158 and the bottom surface 102 of reference plate 94 may indicate that the stock 158 is thinner at that point than at the starting reference point. Similarly, as shown in FIG. 7C, where the gauge block 10 is raised off the work surface 162 by the engagement of bottom surface 102 of reference plate 94 and top surface 160 of piece of stock 158, this may indicate that the piece of stock 158 is thicker at that point relative to the starting reference point.

Similarly, the gauge block 10 may be utilized to check the uniformity of thickness of several pieces of stock 158 by setting the slider assembly 14 into position against a first piece of stock 158, locking it in according to the methods described herein, and then comparing the slider position to the thickness of subsequent pieces of stock 158 utilizing the same method of determination as described above.

Although described herein for use in woodworking, it will be understood that adjustable gauge block 10 may be used in any suitable application where it is desirable to measure the height of something relative to a surface, or the height of something above the work surface. Similarly, it will be understood that gauge block 10 may be used to perform repeated measurements and may allow for replacement of other tools, such as gauge block sets.

It will be further understood that gauge block 10 may be scaled in size to provide larger (or smaller) ranges and/or maximum measurements. According to one example, gauge block 10 may be scaled to a larger size to provide measurements ranging from 0" to greater than 1". For larger applications, it will be understood that various weight reduction concepts may be employed to allow the gauge block 10 to remain manageable while allowing for larger measurements.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An adjustable gauge block comprising:
   a triangular base defining a central channel in a top surface thereof;
   a slider assembly having a reference plate on a first end thereof, the slider assembly carried by the base and slidably engaged within the central channel thereof;
   a quick adjustment button operably connected to the slider assembly;
   a threaded rod within the central channel of the base operable to engage a flange of the quick adjustment button;
   a slider plate of the slider assembly operable to engage the threaded rod; and
   an adjustment knob operable to move the slider plate into engagement and out of engagement with the threaded rod;
   wherein the quick adjustment button is movable from a first position wherein the flange thereof is engaged with the threaded rod and the slider assembly is prevented from movement relative to the base and a second position wherein the flange is disengaged from the threaded rod and the slider assembly is movable relative to the base.

2. The adjustable gauge block of claim 1 wherein the reference plate further comprises:
   a reference plate flange extending beyond at least one side of the base, the flange having a top surface and a bottom surface.

3. The adjustable gauge block of claim 2 further comprising:
   at least one scale corresponding to the position of at least one of the top surface and the bottom surface of the reference plate flange relative to a work surface on which the gauge block is being used.

4. The adjustable gauge block of claim 3 further comprising:
   a first scale corresponding to the position of the top surface of the reference plate flange relative to the work surface; and
   a second scale corresponding to the position of the bottom surface of the reference plate flange relative to the work surface.

5. The adjustable gauge block of claim 2 wherein the slider assembly is movable between a first position wherein the bottom surface of the reference plate flange is coplanar with a bottom of the base and a second position wherein the bottom surface of the reference plate flange is parallel to and above the bottom of the base.

6. The adjustable gauge block of claim 1 wherein the slider plate is operable to prevent movement of the slider assembly when engaged with the threaded rod regardless of the engagement of the threaded rod with the flange of the quick adjustment button.

7. The adjustable gauge block of claim 1 wherein the threaded rod further comprises:
   an adjustment knob operable to rotate the threaded rod with an aperture defined through a second side of the base.

8. The adjustable gauge block of claim 7 wherein rotation of the threaded rod within the aperture is operable to move the slider assembly relative to the base.

9. The adjustable gauge block of claim 8 wherein the quick adjustment button is operable to allow coarse adjustment of the slider assembly relative to the base and the threaded rod is operable to move the slider assembly for fine adjustment of the slider assembly relative to the base.

10. A method of measuring a height above a surface comprising:
    placing a base of an adjustable gauge block on a work surface from which the height is to be measured;
    disengaging a slider plate of a slider assembly of the adjustable gauge block from a threaded rod within a central channel defined in the base via rotation of an adjustment knob in operable communication with the slider plate;
    moving the slider assembly of the adjustable gauge block from a first position wherein a bottom surface of a reference plate on the slider assembly is coplanar with a bottom of the base to a second position wherein the bottom surface of the reference plate is substantially parallel to and above the bottom of the base;
    re-engaging the slider plate of the slider assembly with the threaded rod via the adjustment knob; and
    determining the height of the bottom surface of the reference plate relative to the work surface with a scale on a top surface of the base of the adjustable gauge block based on the position of an edge of the slider assembly relative to the scale.

11. The method of claim 10 wherein moving the slider assembly from the first position to the second position further comprises:
    disengaging a flange of a quick adjustment button from the threaded rod within the central channel defined in the base; and
    sliding the slider assembly relative to an angled top surface of the base to the second position.

12. The method of claim 11 further comprising:
    re-engaging the flange of the quick adjustment button with the threaded rod; and
    rotating the threaded rod to move the slider assembly into the second position.

13. The method of claim 12 wherein the quick adjustment button is operable to allow coarse adjustment of the slider assembly relative to the work surface and the threaded rod is operable to move the slider assembly for fine adjustment of the slider assembly relative to the work surface.

14. The method of claim 10 further comprising:
    setting a height of a tool by contacting the bottom surface of the reference plate with a top of the tool when the slider assembly is in the second position.

15. The method of claim 14 wherein the tool further comprises:
    a table saw and wherein the height of the table saw is set by moving a saw blade of the table saw to contact the bottom surface of the reference plate.

16. The method of claim 10 further comprising:
    setting the depth of a tool above the work surface by contacting a top surface of the reference plate with a bottom of the tool when the slider assembly is in the second position.

17. The method of claim 16 wherein the tool further comprises:
    a drill press and wherein the depth of the drill press is set by moving a drill bit of the drill press to contact the top surface of the reference plate.

18. The method of claim 10 further comprising:
    measuring uniformity of thickness of a piece of stock by contacting a top surface of the piece of stock with the bottom surface of the reference plate; and
    moving the base of the adjustable gauge along an edge of the piece of stock.

19. The method of claim 18 further comprising:
    measuring uniformity of thickness of multiple pieces of stock by contacting a top surface of a first piece of stock with the bottom surface of the reference plate;
    moving the base of the adjustable gauge along an edge of the first piece of stock;
    contacting a top surface of at least one subsequent piece of stock with the bottom surface of the reference plate; and
    moving the base of the adjustable gauge along an edge of the at least one subsequent piece of stock.

20. An adjustable gauge block comprising:
    a triangular base defining a central channel in a top surface thereof;
    a slider assembly having a reference plate on a first end thereof, the slider assembly carried by the base and slidably engaged within the central channel thereof;
    a quick adjustment button operably connected to the slider assembly;
    a threaded rod within the central channel of the base operable to engage a flange of the quick adjustment button;
    a reference plate flange extending beyond at least one side of the base, the flange having a top surface and a bottom surface;
    a first scale corresponding to the position of the top surface of the reference plate flange relative to the work surface; and
    a second scale corresponding to the position of the bottom surface of the reference plate flange relative to the work surface;
    wherein the quick adjustment button is movable from a first position wherein the flange thereof is engaged with the threaded rod and the slider assembly is prevented from movement relative to the base and a second position wherein the flange is disengaged from the threaded rod and the slider assembly is movable relative to the base.

* * * * *